(12) United States Patent
December

(10) Patent No.: US 6,214,188 B1
(45) Date of Patent: Apr. 10, 2001

(54) ANODIC ELECTROCOAT HAVING A CARBAMATE FUNCTIONAL RESIN

(75) Inventor: Timothy S. December, Rochester Hills, MI (US)

(73) Assignee: BASF Corporation, Southfield, MI (US)

( * ) Notice: Subject to any disclaimer, the term of this patent is extended or adjusted under 35 U.S.C. 154(b) by 0 days.

(21) Appl. No.: 09/217,557

(22) Filed: Dec. 21, 1998

(51) Int. Cl.$^7$ .................................................. C08F 2/58
(52) U.S. Cl. .................. 204/489; 204/492; 204/476; 204/493; 204/495; 204/498; 105/287.23; 105/287.25
(58) Field of Search .................... 204/471, 489, 204/490, 492, 494, 496, 498, 505; 106/287.25, 287.23

(56) References Cited

U.S. PATENT DOCUMENTS

| | | |
|---|---|---|
| 3,479,328 | 11/1969 | Nordstrom .......................... 260/86.1 |
| 3,674,838 | 7/1972 | Nordstrom .......................... 260/482 |
| 4,126,747 | 11/1978 | Cowherd, III et al. . |
| 4,279,833 | 7/1981 | Culbertson et al. . |
| 4,340,497 | 7/1982 | Knopf . |
| 4,789,566 | * 12/1988 | Tatsuno .............................. 427/388.2 |
| 4,997,865 | * 3/1991 | Scherping .............................. 523/409 |
| 5,114,993 | * 5/1992 | Scherping .............................. 523/409 |
| 5,242,716 | * 9/1993 | Iwase .................................. 427/407.1 |
| 5,356,669 | 10/1994 | Rehfuss et al. . |
| 5,431,791 | * 7/1995 | December ........................... 204/181.7 |
| 5,547,757 | * 8/1996 | Swarup .................................. 428/413 |
| 5,552,497 | 9/1996 | Taylor et al. . |
| 5,559,195 | 9/1996 | McGee et al. . |
| 5,576,063 | 11/1996 | Briggs et al. . |
| 5,659,003 | 8/1997 | Menovcik et al. . |
| 5,665,433 | * 9/1997 | Moussa ................................. 427/377 |
| 5,693,723 | 12/1997 | Green . |
| 5,693,724 | 12/1997 | Green . |
| 5,723,552 | 3/1998 | Menovcik et al. . |
| 5,726,246 | 3/1998 | Rehfuss et al. . |
| 5,766,769 | 6/1998 | Ohrbom et al. . |
| 5,827,930 | * 10/1998 | Obrbom .............................. 525/440 |
| 5,827,931 | 10/1998 | Menovcik et al. . |
| 5,854,385 | * 12/1998 | McGee ................................ 528/369 |

OTHER PUBLICATIONS

Chemical Process and Technology Encyclopedia, ISBN 0-07-012423-X, p. 217, 1974, No Month Available.*

* cited by examiner

Primary Examiner—Kathryn Gorgos
Assistant Examiner—J. Maisano
(74) Attorney, Agent, or Firm—Mary E. Golota

(57) ABSTRACT

The invention provides a polymer (a) having a polymer backbone having appended thereto at least one carbamate functional group, the polymer represented by randomly repeating units according to the formula:

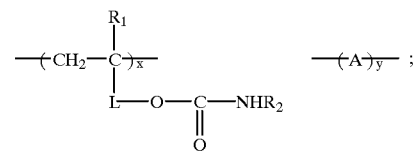

$R_1$ represents H or $CH_3$, $R_2$ represents H, alkyl, or cycloalkyl, L represents a divalent linking group, A represents repeat units comprising at least one repeat unit having a pendant carboxylic acid group, x represents 10 to 90 weight %, and y represents 90 to 10 weight %. The invention further provides an anodic electrocoat coating composition comprising an aqueous dispersion of a polymer (a) and (b) a compound having a plurality of functional groups that are reactive with said carbamate groups, wherein the repeat units A of polymer (a) having a pendant carboxylic acid group are base-salted. Finally, the invention provides an anodic electrodeposition method requiring 1) immersing a conductive substrate in a coating composition comprising, in an aqueous medium, polymer (a) and (b) a compound having a plurality of functional groups that are reactive with said carbamate groups, 2) applying a voltage between a cathode and the conductive substrate, and 3) removing the substrate from the coating composition.

24 Claims, No Drawings

ANODIC ELECTROCOAT HAVING A CARBAMATE FUNCTIONAL RESIN

FIELD OF THE INVENTION

The present invention relates to coating compositions for use in anodic electrodeposition coating processes and methods of anodic electrodeposition. More particularly, the invention provides anodic electrocoat compositions having a carbamate functional resin. The invention also provides methods of anodically electrodepositing a coating on a substrate using the coating compositions of the invention.

BACKGROUND OF THE INVENTION

Coating compositions are widely in use today which utilize a variety of cure mechanisms. Among these are anodic and cathodic electrodeposition coating compositions and methods.

During electrodeposition, an ionically-charged polymer having a relatively low molecular weight is deposited onto a conductive substrate by submerging the substrate in an electrocoat bath having dispersed therein the charged resin, and applying an electrical potential between the substrate and a pole of opposite charge, usually a stainless steel electrode. This produces a relatively soft coating of low molecular weight on the substrate. This coating is usually converted to a hard high molecular weight coating by curing or crosslinking of the resin.

One curing mechanism utilizes a melamine formaldehyde polymer curing agent in the electrodepositable coating composition to react with hydroxyl functional groups on the electrodeposited resin. This curing method provides good cure at relatively low temperatures (e.g., 132° C.), but the crosslinked bonds contain undesirable ether linkages and the resulting coatings provide poor overall corrosion resistance as well as poor chip and cyclic chip-corrosion resistance.

In order to address some of the problems with melamine-crosslinked electrocoats, many users employ polyisocyanate crosslinkers to react with hydroxyl functional groups on the electrodeposited resin. This curing method provides desirable urethane crosslink bonds, but it also entails several disadvantages. In order to prevent premature gelation of the electrodepositable coating composition, the highly reactive isocyanate groups on the curing agent must be blocked (e.g., with an oxime, lactam, or alcohol).

Blocked polyisocyanates, however, require high temperatures (e.g., 176° C. or more) to unblock and begin the curing reaction. The resulting electrocoats can also be susceptible to yellowing. Moreover, the volatile blocking agents released during cure can cause other deleterious effects on various coating properties, as well as increasing VOC. In addition, use of some the volatile blocking agents may give rise to environmental concerns. Finally, the volatile blocking agents account for significant and disadvantageous weight loss upon crosslinking.

There is thus a need in the art for electrodepositable coating compositions that can provide desirable urethane crosslink linkages, but avoid the problems that accompany the use of blocked polyisocyanate curing agents. In particular, it is desireable to provide a anodic electrodeposition coating composition capable of providing urethane linkages at low bake temperatures of 121° C. or less with decreased weight loss upon crosslinking, while being free of isocyanates and the volatile blocking agents used with isocyanates.

SUMMARY OF THE INVENTION

The foregoing objects are achieved with a polymer having a polymer backbone having appended thereto at least one carbamate functional group, the polymer represented by randomly repeating units according to the formula:

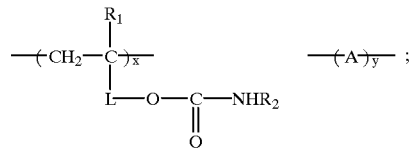

$R_1$ represents H or $CH_3$, $R_2$ represents H, alkyl, or cycloalkyl, L represents a divalent linking group, A represents repeat units comprising at least one repeat unit having a pendant carboxylic acid group, x represents 10 to 90 weight %, and y represents 90 to 10 weight %.

The invention further provides an anodic electrocoat coating composition comprising an aqueous dispersion of a polymer (a) comprising a polymer backbone having appended thereto at least one carbamate functional group, said polymer (a) represented by randomly repeating units according to the formula:

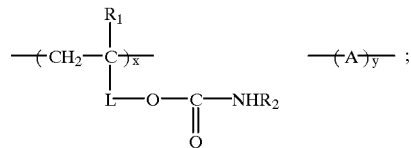

$R_1$ represents H or $CH_3$, $R_2$ represents H, alkyl, or cycloalkyl, L represents a divalent linking group, A represents repeat units comprising at least one repeat unit having a pendant carboxylic acid group, x represents 10 to 90 weight %, y represents 90 to 10 weight %, and (b) a compound having a plurality of functional groups that are reactive with said carbamate groups, wherein the repeat units A having a pendant carboxylic acid group are base-salted.

Finally, the invention provides an anodic electrodeposition method requiring 1) immersing a conductive substrate in a coating composition comprising, in an aqueous medium: (a) a polymer backbone having appended thereto at least one carbamate functional group, said first component represented by randomly repeating units according to the formula:

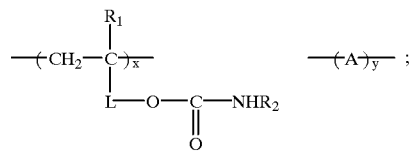

$R_1$ represents H or $CH_3$, $R_2$ represents H, alkyl, or cycloalkyl, L represents a divalent linking group, A comprises at least one repeat unit having a pendant carboxylic acid group which is base-salted, x represents 10 to 90 weight %, and y represents 90 to 10 weight %, and (b) a compound having a plurality of functional groups that are reactive with said carbamate groups, 2) applying a voltage between a cathode and the conductive substrate, and 3) removing the substrate from the coating composition.

DETAILED DESCRIPTION OF THE INVENTION

The polymer (a) of the invention will have at least one carbamate functional group appended to a polymer backbone, preferably a plurality of pendant carbamate functional groups.

Polymer (a) of the invention can be prepared in a variety of ways. One way to prepare such polymers is to prepare an acrylic monomer having a carbamate functionality in the ester portion of the monomer. Such monomers are well-known in the art and are described, for example in U.S. Pat. Nos. 3,479,328, 3,674,838, 4,126,747, 4,279,833, and 4,340,497, the disclosures of which are incorporated herein by reference. One method of synthesis involves reaction of a hydroxy ester with urea to form the carbamyloxy carboxylate (i.e., carbamate-modified acrylic). Another method of synthesis reacts an α,β-unsaturated acid ester with a hydroxy carbamate ester to form the carbamyloxy carboxylate. Yet another technique involves formation of a hydroxyalkyl carbamate by reacting a primary or secondary amine or diamine with a cyclic carbonate such as ethylene carbonate. The hydroxyl group on the hydroxyalkyl carbamate is then esterified by reaction with acrylic or methacrylic acid to form the monomer. Other methods of preparing carbamate-modified acrylic monomers are described in the art, and can be utilized as well. The acrylic monomer can then be polymerized along with other ethylenically-unsaturated monomers, if desired, by techniques well-known in the art. However, such ethylenically unsaturated monomers must comprise at least one monomer having a pendant carboxylic acid group.

For example, preferred methods of preparing the polymer (a) of the invention include the following.

One or more carbamate functional monomers such as 2-carbamate ethyl methyacrylate (CEMA) may be copolymerized with two or more monomers such as an unsaturated organic acid and a alkyl ester of an unsaturated organic acid in the presence of a suitable initiator such as an azo or peroxide initiator. Other suitable carbamate functional monomers include those described above. Suitable unsaturated organic acids will be of the formulas $R^1R^2=R^3COOH$ or $R^1R^2=R^3R^4COOH$, where $R^1$, $R^2$, $R^3$, and $R^4$ may be the same or different and are selected from the group consisting of H, alkyl groups of from 2 to 12 carbons, and mixtures thereof. Examples of suitable unsaturated organic acids include acrylic acid, methacrylic acid, crotoic acid, vinylacetate acid, tiglic acid, 3,3-dimethylacrylic acid, trans-2-pentenoic acid, 4-pentenoic acid, trans-2-methyl-2-pentenoic acid, 6-heptanoic acid, 2-octenoic acid, and the like. Preferred unsaturated organic acids include acrylic acid, methacrylic acid, and mixtures thereof. Examples of suitable alkyl esters of unsaturated organic acid include ethyl acrylate, butyl acrylate, 2-ethylhexyl acrylate, butyl methyacrylate, isodecyl methyacrylate, hydroxyethyl methacrylate, hydroxypropyl methacrylate, and the like. Preferred alkyl esters are nonhydroxy functional esters such as butyl acrylate and butylmethacrylate.

Other ethylenically unsaturated monomers such as styrene may be used to form repeating units A, discussed below.

In another reaction scheme, an isocyanate functional monomer such as unsaturated m-tetramethyl xylene isocyanate (sold by American Cyanamid as TMI®) can be copolymerized with monomers such as alkyl esters such as described immediately above such as butyl acrylate and unsaturated monomers such as styrene to produce an isocyanate functional polymer. The required carboxylic acid functionality and carbamate functionality can then be grafted onto the isocyanate functional polymer by a two-stage reaction having a first stage using a carbamate functional monomer such as hydroxypropyl carbamate followed by a second stage using a carboxylic acid of the formula HO—(R)—COOH or an amine salt of the formula HO—(R)—COOH$^+$NR$_3$, wherein R is an alkyl group of from 1 to 12 carbons, preferably from 2 to 8 carbons.

Alternatively, one or more carbamate functional monomers may be reacted with an isocyanate functional monomer such as an unsaturated m-tetramethyl xylene isocyanate to produce a carbamate functional monomer. Additional isocyanate monomer may be added to introduce isocyanate fictionally in the monomer mixture. After polymerizing the one or more monomers, the required pendant carboxylic acid functionality can be grafted onto the polymer backbone using a carboxylic acid functional compound having at least one group reactive with an isocyanate, such as a hydroxy carboxylic acid.

Alternatively, carbamate functional adducts made from polyisocyanate functional compounds such as IPDI or TDI and hydroxy carbamate compounds can be made and then grafted onto acrylic, epoxy or other hydroxy functional polymers having acid numbers of at least 20, preferably 30. Of course, it will be appreciated that such resins must have the characteristics required for in electrocoat compositions as discussed herein. Preferred polymers for use as the backbone are hydroxyl functional acrylic resins with acid numbers of at least 20, preferably at least 30.

A most preferred method of making the polymer (a) of the invention involves the copolymerization of at least one carbamate functional monomer, at least one unsaturated organic acid, at least one alkyl ester of an unsaturated organic acid and at least one additional ethylenically unsaturated monomer such as styrene. A most preferred reaction scheme involves the copolymerization of CEMA, acrylic acid, styrene and butyl acrylate in the presence of an azo or peroxide initiator.

The polymer component (a) call be represented by the randomly repeating units according to the following formula:

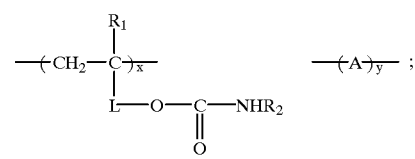

In the above formula, $R_1$ represents H or $CH_3$. $R2$ represents H, alkyl, preferably of 1 to 6 carbon atoms, or cycloalkyl, preferably up to 6 ring carbon atoms. It is to be understood that the terms alkyl and cycloalkyl arc to include substituted alkyl and cycloalkyl, such as halogen substituted alkyl or cycloalkyl. Substituents that will have an adverse impact on the properties of the cured material, however, arc to be avoided. For example, ether linkages are thought to be susceptible to hydrolysis, and should be avoided in locations that would place the ether linkage in the crosslink matrix. The values x and y represent weight percentages, with x being 10 to 90% and preferably 40 to 60%, and y being 90 to 10% and preferably 60 to 40%.

In the formula, A represents repeat units derived from one or more ethylenically unsaturated monomers, at least one of which repeat units must have a pendant carboxylic acid group. The at least one carboxylic acid group may derive from the use of at least one ethylenically unsaturated monomer having at least one carboxylic acid group, preferably a pendant or terminal carboxylic acid group. Alternatively, the at least one repeating unit having a pendant carboxylic acid may derive from the graft of a free organic acid to the polymer backbone of the repeating units (A), as discussed above, wherein such free organic acid has a functional group reactive with the backbone polymer.

Examples of ethylenically unsaturated monomers having a pendant carboxylic acid group include acrylic acid, methacrylic acid, crotoic acid, vinylacetate acid, tiglic acid, 3,3-dimethylacrylic acid, trans-2-pentenoic acid, 4-pentenoic acid, trans-2-methyl-2-pentenoic acid, 6-heptanoic acid, 2-octenoic acid, and the like. Preferred ethylenically unsaturated monomers having a pendant carboxylic acid are acrylic acid, methacrylic acid and mixtures there of.

Examples of free organic acids which may be used to graft a pendant carboxylic acid group to the backbone polymer include compounds of the formula HO—(R)—COOH or an amine salt of the formula HO—(R)—COOH$^+$NR$_3$, wherein R is an alkyl group of from 1 to 12 carbons, preferably from 2 to 8 carbons. Polyacids such as malic acid and citric acid may also be used. Preferred organic free acids are lactic acid, glycolic acid and stearic acid.

Other monomers which may be utilitzed to provide repeating units (A) not having pendant carboxylic acid functionality are those monomers for copolymerization with acrylic monomers known in the art. These include alkyl esters of acrylic or methacrylic acid, e.g., ethyl acrylate, butyl acrylate, 2-ethylhexyl acrylate, butyl methacrylate, isodecyl methacrylate, hydroxyethyl methacrylate, hydroxypropyl acrylate, and the like; and vinyl monomers such as unsaturated m-tetramethyl xylene isocyanate (sold by American Cyanamid as TMI®), styrene, vinyl toluene and the like.

L represents a divalent linking group, preferably an aliphatic of 1 to 8 carbon atoms, cycloaliphatic, or aromatic linking group of 6 to 10 carbon atoms. Examples of L include

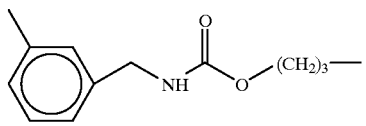

—(CH$_2$)—, —(CH$_2$)$_2$—, —(CH$_2$)$_4$—, and the like. In one preferred embodiment, —L— is represented by —COO—L'— where L' is a divalent linking group. Thus, in a preferred embodiment of the invention, the polymer component (a) is represented by randomly repeating units according to the following formula:

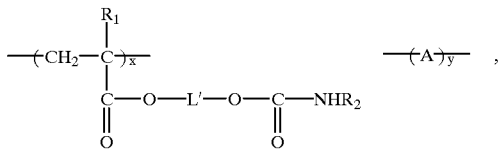

In this formula, R$_1$, R$_2$, A, x, and y are as defined above. L' may be a divalent aliphatic linking group, preferably of 1 to 8 carbon atoms, e.g., —(CH$_2$)—, —(CH$_2$)$_2$—, —(CH$_2$)$_4$—, and the like, or a divalent cycloaliphatic linking group, preferably up to 8 carbon atoms, e.g., cyclohexyl, and the like. However, other divalent linking groups can be used, depending on the technique used to prepare the polymer. For example, if a hiydroxyalkyl carbarnate is adducted onto an isocyanate-functional acrylic polymer, the linking group L' would include an —NHCOO— urethane linkage as a residue of the isocyanate group. Of course, A would still require the necessary pendant carboxylic acid groups as discussed above.

The polymer (a) will generally have a weight average molecular weight of 2000–100,000, and preferably from 10,000–60,000. Molecular weight can be determined by the GPC method using a polystyrene standard.

The glass transition temperature, T$_g$, of components (a) and (b) can be adjusted to achieve a cured coating having the T$_g$ for the particular application involved. The average T$_g$ of unreacted components (a) and (b) should be between 0° C. and 100° C., with the individual T$_g$'s being adjusted to achieve optimum performance.

Polymer (a) may be further characterized by an acid number of from 20 to 80, preferably an acid number of from 30 to 50 and most preferably an acid number of from 30 to 35.

Polymer (a) should also have a carbamate equivalent weight (grams of polymer (a)/equivalent of carbamate) of from 150 to 1200, preferably from 200 to 600, and most preferably from 300 to 400.

It be will appreciated that the various monomers and/or reactants used to make polymer (a) will be used in amounts necessary to obtain the required acid number, Tg, weight average molecular weight and carbamate equivalent weight.

The anodic coating composition of the invention also comprises a curing agent (b). Curing agent (b) is a compound having a plurality of functional groups that are reactive with the carbamate groups on component (a). Such reactive groups include active methylol or methylalkoxy groups on aminoplast crosslinking agents or on other compounds such as phenol/formaldehyde adducts, isocyanate groups, siloxane groups, cyclic carbonate groups, and anhydride groups. Examples of (b) compounds include melamine formaldehyde resin (including monomeric or polymeric melamine resin and partially or fully alkylated melamine resin), urea resins (e.g., methylol ureas such as urea formaldehyde resin, alkoxy ureas such as butylated urea formaldehyde resin), benzoguanamine resins, glycol uril formaldehyde resins, polyanhydrides (e.g., polysuccinic anhydride), and polysiloxanes (e.g., trimethoxy siloxane). Aminoplast resin such as melamine formaldehyde resin or urea formaldehyde resin are especially preferred.

Polymer (a) when base-salted is water-dispersible and is useful in electrodeposition processes, especially when incorporated into an emulsion or dispersion. The aqueous dispersion of polymer (a) should be neutralized to a degree sufficient to (i) form an emulsion micelle of less than 0.50 μm, preferably less than 0.20 μm, and (ii) provide emulsion stability in the electrocoat deposition bath.

Electrodepositable coating compositions are dispersed in aqueous medium. The term "dispersion" as used within the context of the present invention is believed to be a two-phase translucent or opaque aqueous resinous system in which the resin is in the dispersed phase and water the continuous phase. The average particle size diameter of the resinous phase is about 0.05 to 5.0 microns, preferably less than 2.0 microns.

The concentration of the polymer (a) in the aqueous medium is, in general, not critical, but ordinarily the major portion of the aqueous dispersion is water. The aqueous dispersion usually contains from about 3 to 50 percent, preferably 10 to 40 percent by weight resin solids. Aqueous resin concentrates which are to be further diluted with water, generally range from 10 to 30 percent by total weight solids.

Polymer (a) must be base-salted for use in the anodic coating composition of the invention. The term "base-salted" refers to the reaction of the pendant carboxylic acid groups with a basic compound in an amount sufficient to neutralize enough of the acid groups to impart waterdispersibility to polymer (a). It will be appreciated that this reaction may be referred to as "salting" or "neutralizing". Illustrative basic compounds include Lewis and Brönstead bases. Examples of suitable bases for use in base-salting or neutralizing the polymer (a) include amines and hydroxide compounds such as potassium hydroxide and sodium hydroxide. Amines are preferred. Illustrative amines include N,N-dimethylethylamine (DMEA), N,N-diethylmethylamine, triethylamine, triethanolamine, triisopropylamine, dimethylethanolamine, diethylethanolamine, diisopropylethanolamine, dibutylethanolamine, methyldiethanolamine, dimethylisopropanolamine, methyldiisopropanolamine, dimethylethanolamine, and the like. Preferred amines are tertiary amines such as dimethylethylamine and dimethylethanolamine.

The coating composition of the invention can further contain catalysts to facilitate the reaction between polymer (a) and curing agent (b). For example, a strong acid catalyst may be utilized to enhance the cure reaction. It will be appreciated that such catalysts may be blocked or unblocked. Such catalysts are well-known in the art and include, for example, p-toluenesulfonic acid, dinonylnaphthalene disulfonic acid, dodecylbenzenesulfonic acid, phenyl acid phosphate, monobutyl maleate, butyl phosphate, and hydroxy phosphate ester. Other catalysts that may be useful in the composition of the invention include Lewis acids, zinc salts, and tin salts. Such catalysts will typically be used in an amount of from 0.1 to 3.0 weight percent, based on the resin solids, preferably from 0.5 to 2.0 weight percent, based on the resin solids.

Besides water, the aqueous medium of an electrocoat composition may also contain a coalescing solvent. Useful coalescing solvents include hydrocarbons, alcohols, esters, ethers and ketones. The preferred coalescing solvents include alcohols, polyols and ketones. Specific coalescing solvents include monobutyl and monohexyl ethers of ethylene glycol, and phenyl ether of propylene, ethylene glycol butyl ether, ethyleneglycol dimethyl ether, or mixtures thereof. A small amount of a water-immiscible organic solvent such as xylene, toluene, methyl isobutyl ketone or 2-ethylhexanol may be added to the mixture of water and the water-miscible organic solvent. The amount of coalescing solvent is not unduly critical and is generally between about 0 to 15 percent by weight, preferably about 0.5 to 5 percent by weight based on total weight of the resin solids.

Electrodeposition coating compositions may further contain conventional pigments such as titanium dioxide, ferric oxide, carbon black, aluminum silicate, precipitated barium sulfate, aluminum phosphomolybdate, strontium chromate, basic lead silicate or lead chromate. The pigment-to-resin weight ratio can be important and should be preferably less than 50:100, more preferably less than 40:100, and usually about 10 to 30:100. Higher pigment-to-resin solids weight ratios have also been found to adversely affect coalescence, flow, and/or coating performance.

Electrodeposition coating compositions can contain optional ingredients such as wetting agents, surfactants, defoamers, antioxidants, UV absorbers, light stabilizers, and so forth. Examples of surfactants and wetting agents include alkyl imidazolines such as those available from Ciba-Geigy Industrial Chemicals as Amine C®, acetylenic alcohols available from Air Products and Chemicals as Surfynol® 104. These optional ingredients, when present, constitute from about 0 to 20 percent by weight of resin solids, and preferably from 0.1 to 1.0 percent by weight of resin solids. Plasticizers are optional ingredients because they promote flow. Examples are high boiling water immiscible materials such as polyalkylene polyols, such as polypropylene polyols or ethylene or propylene oxide adducts of nonyl phenols or bisphenol A. Plasticizers can be used and if so are usually used at levels of about 0 to 15 percent by weight resin solids.

In general, sufficient water is added so that the dispersion has a solids content of more than 20, preferably more than 30% by weight.

The electrodeposition coating composition should have an electroconductivity from 0.1 to 5 mS/cm, preferably from 0.5 to 3 mS/cm. When this value is too low, it is difficult to obtain a film thickness having desired protective and other functions. Conversely, if the composition is too conductive, problems such as the dissolution of substrate or counter electrode in the bath, uneven film thickness or poor water or corrosion resistance may arise.

Electrodeposition coating compositions may be applied on a conductive substrate by the electrodeposition coating process at a nonvolatile content of 10 to 25% by weight to a dry film thickness of 10 to 35 microns. After application, the coating may be cured at an elevated temperature, depending upon the nature of particular base resins. Prior art anodic electrodeposition coatings based on blocked isocyanates typically cure at approximately 20 minutes at 350° F. (metal temperature). The anodic electrodeposition coating compositions of the invention cure at 20 minutes at 250° F. or less (metal temperature), preferably at 20 minutes at 200° F. (metal temperature).

The cathodic electrodeposition coatings of the invention are advantageous in that % weight loss upon crosslinking is less than 15%, preferably less than 10% and most preferably from 6 to 8%, based on the total weight of applied coating.

It will be appreciated that the method of anodic deposition of the invention may further comprise rinsing and baking the coated substrate after removal from the coating composition bath.

Electrodeposition of the coating preparations according to the invention may be carried out by any of a number of processes known to those skilled in the art. The deposition may be carried out on all electrically conducting substrates, for example metal, such as steel, copper, aluminum and the like.

In a preferred embodiment, the anodic electrodeposition method of the invention will be used to provide a second layer of electrodeposited coating. In such a case, the conductive substrate of the invention will comprise a previously coated substrate, preferably a substrate to which a cathodic electrodeposition coating has been applied. Such a cathodic electrodeposition coating is described in U.S. Pat. No. 5,431,791, hereby incorporated by reference.

A pigmented resin coating and optionally a clearcoat layer may be applied over primer layers, including electrocoat primer layers. In automotive applications, the pigmented resin layer is often called a basecoat or pigmented basecoat. The resin in the pigmented resin layer can be of a number of resins known in the art. For example, the resin can be an acrylic, a polyurethane, or a polyester. Typical pigmented resin coating formulations are described in U.S. Pat. Nos. 4,791,168, 4,414,357, and 4,546,046, the disclosures of which are incorporated herein by reference. In one preferred embodiment, the resin is an ε-caprolactone-modified acrylic resin, as described in U.S. Pat. No. 4,720,528, the disclosure of which is incorporated herein by reference. The pigmented resin can be cured by any of the known mechanisms and curing agents, such as a melamine polyol reaction (e.g., melamine cure of a hydroxy-functional acrylic resin).

Other pigmented basecoat compositions for such composite coatings are well known in the art, and do not require explanation in detail herein. Polymers known in the art to be useful in basecoat compositions include acrylics, vinyls, polyurethanes, polycarbonates, polyesters, alkyds, and polysiloxanes. Preferred polymers include acrylics and polyurethanes. Basecoat polymers are preferably crosslinkable, and thus comprise one or more type of cross-linkable functional groups. Such groups include, for example, hydroxy, isocyanate, amine, epoxy, acrylate, vinyl, silane, and acetoacetate groups. These groups may be masked or blocked in such a way so that they are unblocked and available for the cross-linking reaction under the desired curing conditions, generally elevated temperatures. Useful cross-linkable functional groups include hydroxy, epoxy, acid, anhydride, silane, and acetoacetate groups. Preferred cross-linkable functional groups include hydroxy functional groups and amino functional groups.

Basecoat polymers may be self-cross-linkable, or may require a separate cross-linking agent that is reactive with the functional groups of the polymer. When the polymer comprises hydroxy functional groups, for example, the cross-linking agent may be an aminoplast resin, isocyanate and blocked isocyanates (including isocyanurates), and acid or anhydride functional cross-linking agents.

After an article is coated with the above-described layers, the composition is subjected to conditions so as to cure the coating layers. Although various methods of curing may be used, including curing at ambient conditions, heat-curing is preferred because it has added benefits, such as driving off residual water or solvent from the coating composition. Generally, heat curing is effected by exposing the coated article to elevated temperatures provided primarily by radiative heat sources. Curing temperatures will vary depending on the particular blocking groups used in the cross-linking agents, however they generally range between 90° C. and 200° C., preferably between 121° C. and 162° C., and most preferably between 121° C. and 141° C. The curing time will vary depending on the particular components used, and physical parameters such as the thickness of the layers, however, typical curing times range from 15 to 60 minutes.

The invention is further described in the following examples.

EXAMPLE 1

Preparation of a Polymer (a) According to the Invention

To a 1000 ml flask equipped with a mixer, condenser and temperature probe were added 83.5 g propylene glycol methy ether (PM) and 14.0 g acetone. The solvent blend was heated to reflux ( ca. 98° C.). To a separate vessel were added the following monomers: 257.1 g of carbamate ethyl methacrylate (CEMA) @ 70% in PM, 16.0 g acrylic acid and 204.0 g butyl acrylate (BA). 6.5 g of 2,2'-Azobis-(2-methylbutyronitrile) (VAZO 67) dissolved in 12.9 g acetone was then added to the monomer mixture. The monomer/initiator mixture was added to the reaction flask over 2 hours while the temperature was maintained between 96 C. and 102 C. The reaction was held for 1.25 hours at 96–102 C. A final initiator addition of 1.8 g VAZO 67 in 1.8 g acetone was made. The reaction was held for 2 hours at 96–102 C. The resulting product has a molecular weight of 32,000 (by GPC) at 70% solids. The theo. Tg is 9 C. The polymer has a carbamate equivalent weight of 385 g polymer NV/eq carbamate functionality. For anodic emulsification the polymer has a meq Acid of 0.56 grams polymer/N salting site (Acid number is 31).

EXAMPLE 2

Preparation of an Anodic Emulsion Comprising Polymer (a) of the Invention

To a gallon vessel were added 500.0 g of polymer (a) from Example 1, 132.3 g an aminoplast resin (melamine Cymel 1156 from Cytec) and 30.9 g of plasticizer (Synfac 8009 from Milliken Chemical). The component were mixed until homogenous. To this was added 16.8 g of the salt of dodecylbenzesulfonic acid and oxizlidone. The emulsion was neutralized with 9.6 g dimethylethylamine. This was mixed until homogenous. A total of 1902.4 g deionized water was added in portions with good mixing. The resulting emulsion had a solids content of 20%. The pH was 7.9 and the conductivity was 753 micromhos. The emulsion had a particle size of 0.22 microns. The meq acid was 0.37 and the meq base was 0.185 for a neutralization of 50%.

EXAMPLE 3

Preparation of Pigment Grind Paste

Part A

To a 3000 ml flask equipped with a mixer, condenser and temperature probe were added 361.0 methy amyl ketone. The solvent blend was heated to reflux (ca. 149 C.). To a separate vessel were added the monomers: 142.2 g butyl methacrylate, 729.0 g styrene and 402.6 g tetramethylene isocyanate (Cytec TMI). To the monomer mix was added 127.4 g t-butlperacetate initiator. The monomer/initiator mix was added to the reaction flask over 3 hours while maintaining the temperature between 149 C. and 151 C. The reaction was held for 0.5 hours at 149–151 C. A final initiator add of 63.8 g t-butylperacetate was made. The reaction was held for 1.5 hours at 149–151 C. The product had 79% solids. For grafting sites the polymer had an isocyanate equivalent weight of 961 g polymer solution/eq isocyanate functionality.

Part B

To a 1000 ml flask equipped with a mixer, condenser and temperature probe were added 394.8 g of the isocyanate functional acrylic of Part A, 76.5 carbowax MPEG2000 (Union Carbide), and 0.11 g dibutyltindilaurate. The batch was heated to 140 C. and held for 2 hours to a NCO equivalent weight of 1114. The batch was cooled to 120 C. and 99.0 g 12-hydroxysteric acid added. The reaction was held for 9 hours at 102 C. until the isocyanate equivalent weight was greater than 20K. The resin was diluted with 5.7 g propylene glycol methyl ether and 589.6 g propylene glycol ether. The meq Acid was 0.615 meq acid/gram NV polymer (Acid number is 35.6 mg KOH/gram NV polymer). A total of 18.2 g dimethylethylamine was added for salting. The meq Base was 0.413 meq base/g NV. The polymer had a molecular weight of 16,000 and a polydispersity of 3.2.

Part C

To a 3 quart stainless steel milling pot were added 320.0 g of the polymer from Part B, 865.0 g deionized water, 12.8 g carbon black 131.2 g aluminum silicate clay, and 656.0 g titanium dioxide. The pigments and polymer B were mixed with a cowles blade until homogenous. To the pot mill were added 1960.0 g of zirconium oxide media (Zircoa Inc.) The batch was milled for 2 hours to a fineness of grind of less than 10 microns. The P/B was 5/1. The paste solids were 48.4% with a density of 11.9 pounds/gallon and a viscosity of 100 cps. The pH of the paste was 8.5.

EXAMPLE 4

Preparation of an Anodic Electrocoat Coating Composition Bath

To a gallon vessel were added 2400 g of the emulsion from Example 2 and 248 g of the grey, Pb free, pigment paste of Example 3. The bath has a pigment/binder ratio of 0.2 and a solids content of 19%. The bath was mixed for 2 hours in an open vessel. The bath has a pH of 7.8 and a conductivity of 800 micromhos.

EXAMPLE 5

Method of Anodically Depositing an Electrocoat Coating Composition

Using a DC rectifier, steel and aluminum panels were coated via anodic electrodeposition with the bath of Example 4. The set voltage was 50–100 volts and 0.5 amps for 2.2 minutes. The bath temperature was 700° F.

The panels were baked at 30'×250° F. and 30×270° F. in a gas oven. The cured films had a good smooth, continuous appearance and the film build was 0.8 mil. The solvent resistance was good and passed the 100 MEK rubs test. The coating had a Tukon hardness of 5 knoops. The coating had excellent adhesion to both the aluminum and steel substrates.

TABLE 1

Performance Test Results of Panels coated according to the invention.

| | Gravelometer[1] 1200 ml steel shot @ room temperature | Salt Spray[2] 1000 hours | Cyclic corrosion (GM 9540P) |
|---|---|---|---|
| Aluminum substrate | (Not tested) | less than 1 mm scribe creep; no blistering or loss of film | less than 1 mm scribe creep; no blistering or loss of film |
| Steel substrate | 39% paint loss | Face corrosion | Face corrosion |

I claim:
1. A polymer composition comprising:
a polymer (a) having a polymer backbone having appended thereto at least one carbamate functional group, said polymer represented by randomly repeating units according to the formula:

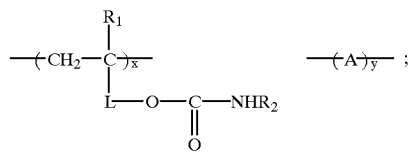

$R_1$ represents H or $CH_3$,
$R_2$ represents H, alkyl, or cycloalkyl,
L represents a divalent linking group,
A represents repeat units comprising at least one repeat unit having a pendant carboxylic acid group,
x represents 10 to 90 weight %, and
y represents 90 to 10 weight %.
2. The polymer composition of claim 1 wherein A further comprises repeat units derived from one or more ethylenically unsaturated monomers.
3. The polymer composition of claim I wherein A comprises repeat units having a pendant carboxylic acid group which are derived from at least one ethylenically unsaturated monomer having a pendant carboxylic acid group.
4. The polymer composition of claim 1, wherein the pendant carboxylic acid groups of repeat units A are base-salted.

5. The polymer composition of claim 4 wherein the pendant carboxylic acid groups are reacted with an amine.
6. The polymer composition of claim 5 wherein the pendant carboxylic acid groups are reacted with a tertiary amine.
7. The polymer composition of claim 1 having a weight average molecular weight of from about 2000 to 100,000.
8. The polymer composition of claim 7 having a weight average molecular weight of from about 10,000 to 60,000.
9. The polymer composition of claim 1 having an acid number of from 20 to 80.
10. The polymer composition of claim 9 having an acid number of from 30 to 50.
11. An anodic electrocoat coating composition comprising an aqueous dispersion of
(a) a polymer comprising a polymer backbone having appended thereto at least one carbamate functional group, said first component represented by randomly repeating units according to the formula:

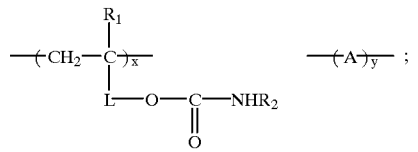

wherein
$R_1$ represents H or $CH_3$,
$R_2$ represents H, alkyl, or cycloalkyl,
L represents a divalent linking group,
A represents repeat units comprising at least one repeat unit having a pendant carboxylic acid group,
x represents 10 to 90 weight %, and
y represents 90 to 10 weight %, and
(b) a compound having a plurality of functional groups that are reactive with said carbamate groups,
wherein the repeat units A having a pendant carboxylic acid group are base-salted.
12. The anodic electrocoat coating composition of claim 11 wherein A further comprises repeat units derived from one or more ethylenically unsaturated monomers.
13. The anodic electrocoat coating composition of claim 11 wherein A comprises repeat units having a pendant carboxylic acid group which are derived from at least one ethylenically unsaturated monomer having a pendant carboxylic acid group.
14. The anodic electrocoat coating composition of claim 11 wherein the pendant carboxylic acid groups are base-salted by reaction with an amine.
15. The anodic electrocoat coating composition of claim 14 wherein the amine is a tertiary amine.
16. The anodic electrocoat coating composition of claim 11 wherein polymer (a) has a weight average molecular weight of from about 10,000 to 60,000.
17. The anodic electrocoat coating composition of claim 11 wherein polymer (a) has an acid number of from 30 to 50.
18. An anodic electrodeposition method, comprising 1) immersing a conductive substrate in a coating composition comprising, in an aqueous medium:
(a) a polymer backbone having appended thereto at least one carbamate functional group, said first component represented by randomly repeating units according to the formula:

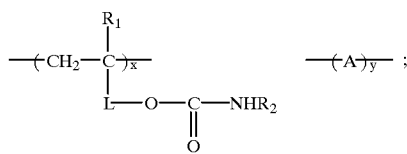

wherein
- $R_1$ represents H or $CH_3$,
- $R_2$ represents H, alkyl, or cycloalkyl,
- L represents a divalent linking group,
- A represents repeat units comprising at least one repeat unit having a pendant carboxylic acid group which is base-salted,
- x represents 10 to 90 weight %, and
- y represents 90 to 10 weight %, and (b) a compound having a plurality of functional groups that are reactive with said carbamate groups, 2) applying a voltage between a cathode and the conductive substrate, and 3) removing the substrate from the coating composition.

19. The method of claim 18 further comprising rinsing the substrate.

20. The method of claim 18 further comprising baking the substrate at a temperature of from 200° to 300° F.

21. The method of claim 18 wherein the conductive substrate comprises metal.

22. The method of claim 21 wherein the metal is selected from the group consisting of aluminum and steel.

23. The method of claim 18 wherein the conductive substrate comprises a previously applied conductive coating.

24. The method of claim 23 wherein the previously applied conductive coating is a cathodic electrocoat coating.

* * * * *